(12) United States Patent
Yabuta et al.

(10) Patent No.: US 7,479,645 B2
(45) Date of Patent: *Jan. 20, 2009

(54) DEVICE FOR PRODUCING EXTREME UV RADIATION

(75) Inventors: Hironobu Yabuta, Himeji (JP); Taku Sumitomo, Himeji (JP)

(73) Assignee: Ushiodenki Kabushiki Kaisha, Tokyo (JP)

(*) Notice: Subject to any disclaimer, the term of this patent is extended or adjusted under 35 U.S.C. 154(b) by 257 days.

This patent is subject to a terminal disclaimer.

(21) Appl. No.: 11/459,142

(22) Filed: Jul. 21, 2006

(65) Prior Publication Data
US 2007/0018119 A1  Jan. 25, 2007

(30) Foreign Application Priority Data
Jul. 21, 2005 (JP) .............................. 2005-211982

(51) Int. Cl.
*G01N 21/33* (2006.01)
*G01N 21/00* (2006.01)
*H05G 2/00* (2006.01)

(52) U.S. Cl. ............... 250/504 R; 250/365; 250/493.1; 250/505.1; 315/111.01; 315/111.21

(58) Field of Classification Search ............. 250/504 R, 250/365, 493.1, 505.1; 315/111.01, 111.21
See application file for complete search history.

(56) References Cited

U.S. PATENT DOCUMENTS 6,984,941 B2 * 1/2006 Hiramoto et al. ....... 315/111.01
2006/0163500 A1 * 7/2006 Inoue et al. .............. 250/493.1

* cited by examiner

*Primary Examiner*—Nikita Wells
(74) *Attorney, Agent, or Firm*—David S. Safran; Roberts Mlotkowski; Safran & Cole, P.C.

(57) ABSTRACT

An extreme UV radiation producing device in which adhesion of solid tin in the vacuum pump of an evacuation device is restricted, so that the maintenance period and the replacement period of the pump is prolonged is achieved by the provision of a treatment unit between a radiation source chamber and the evacuation device. The treatment device has a hydrogen radical producing part in which tin and/or a tin compound in the evacuated gas from the radiation source chamber is/are made into a tin hydride; and a heat treatment part in which the tin hydride is thermally decomposed and in which the tin produced liquefied and separated from the evacuated gas. The liquid tin is fed into a collecting/storage vessel and the evacuated gas from which the tin and/or a tin compound has been removed fed to the evacuation device.

6 Claims, 6 Drawing Sheets

FIG. 6

DEVICE FOR PRODUCING EXTREME UV RADIATION

BACKGROUND OF THE INVENTION

1. Field of the Invention

The invention relates to a device for producing extreme UV radiation which emits extreme UV radiation. The invention relates especially to a device for producing extreme UV radiation using tin as the radiation source of the extreme UV radiation in which the service life of the evacuation device and the like is prolonged by producing hydrogen radicals.

2. Description of Related Art

An improvement in resolution has been required in projection exposure tool with miniaturization and increased integration of integrated semiconductor circuits for its manufacture. To meet these requirements, the wavelengths of the exposure radiation source are being increasingly shortened. As a semiconductor exposure radiation source of the next generation in succession to an excimer laser device, a device for producing extreme UV radiation (hereinafter also called an EUV radiation producing device) is being developed which emits extreme UV radiation (hereinafter EUV radiation) with wavelengths from 13 nm to 14 nm, especially with a wavelength of 13.5 nm.

Several schemes are known for producing EUV radiation in an EUV radiation producing device. In one, a high density and high temperature plasma is produced by heating and excitation of an EUV radiating species and EUV radiation is extracted from this plasma.

The EUV radiation producing device adopting such a scheme based on the method of production of a high density and high temperature plasma is roughly divided into an EUV radiation producing device of the LPP (laser produced plasma) type and an EUV radiation producing device of the DPP(discharge produced plasma)type.

In an EUV radiation producing device of the LPP type, EUV radiation emitted from a high density and high temperature plasma which is formed when irradiated targets such as solids, liquid, gas and the like are irradiated with a pulsed laser is used.

On the other hand, in an EUV radiation producing device of the DPP type, EUV radiation emitted from a high density and high temperature plasma which is produced by power current driving is used. As the discharge methods in an EUV radiation producing device of the DPP type, a Z pinch method, a capillary discharge method, a dense plasma focus method, a hollow cathode triggered Z pinch method and the like are known. The EUV radiation producing device of the DPP type compared to the EUV radiation producing device of the LPP type has the advantages of a downsized radiation source device and a less power consumption of the radiation source system. Therefore, the EUV radiation producing device of the DPP type is strongly expected for practiced use in the market.

In the above described EUV radiation producing devices of the two types. Roughly decavalent xenon (Xe) ions and tin (Sn) ions are currently considered as the radiating species which emits EUV radiation with a wavelength of 13.5 nm, i.e., the raw material for the high density and high temperature plasma. Especially, tin has several times higher EUV conversion efficiency than that of xenon. Here, EUV conversion efficiency is defined as the ratio of the EUV radiation output with a wavelength of 13.5 nm to the electrical input for producing a high density and high temperature plasma. Therefore, tin is most promising radiation species for a high power EUV radiation source of the production model. As, for example, disclosed in Japanese patent disclosure document 2004-279246 (corresponding to U.S. Pat. No. 6,984,941), an EUV radiation source using a gaseous tin compound (for example, stannane gas: $SnH_4$ gas) as the raw material for supply of tin as the EUV radiating species is being developed.

However there is also the disadvantage. Tin is a solid at room temperature and has a low vapor pressure. Therefore, a large amount of debris due to the tin is arising when tin and/or tin compound, which are being fed into a radiation source chamber, is heated and excited, and a high density and high temperature plasma is produced.

The EUV radiation producing device outputs EUV radiation to a subsequent stage, which is emitted by a high density and high temperature plasma which is produced in the radiation source chamber via a collector mirror which is located in the radiation source chamber to a subsequent stage. In the case in which debris due to the tin is deposited on this collector mirror, the reflectivity of the collector mirror is reduced with respect to the wavelength of 13.5 nm. As a result, the output of the EUV radiation to a subsequent stage is reduced.

To overcome this disadvantage, the applicant in Japanese patent application 2005-15182 (corresponding to U.S. patent application No. 11/337539) has proposed a process and a device for implementing this process in which hydrogen radicals react with tin which has deposited on the collector mirror, in which the tin with a low vapor pressure is converted into tin hydride with a high vapor pressure and thus is transferred into the gaseous state, and in which the tin which has deposited on the collector mirror is removed (the collector mirror is cleaned). In this connection, the term "hydrogen radicals" means hydrogen atoms (also called atomic hydrogen). They have unpaired electrons, by which the activation effect is high. They are particles with high reactivity. The process for producing the hydrogen radicals can be a thermal catalyst method, a discharge plasma method and the like. In the thermal catalyst method, the hydrogen gas is brought into contact with a metal with a high melting point, such as tungsten or the like, which is heated for example to roughly 1800° C. and dissociates, by which high density radicals are produced. For the discharge plasma method, which are produced in the plasma together with ions, generated by a radio-frequency discharge or a microwave discharge, are used.

The tin hydride which is formed in this cleaning process, and at least part of the raw material which contains the tin supplied to the discharge plasma region, are evacuated from the radiation source chamber to outside of the EUV radiation producing device by an evacuation device connected to the radiation source chamber. The evacuation device comprises, for example, a vacuum pump, such as a turbomolecular pump or a rotary pump which is connected downstream of the turbomolecular pump or the like. In the gas which is released from the radiation source chamber, tin, tin hydride and tin compounds are contained. The tin, which exists in the evacuated gas and which is formed by decomposition of tin hydride and of a tin compound in the evacuated gas, adheres as solid tin to the rotor and the sliding part of the vacuum pump of the evacuation device; this leads to the disadvantage of a decreased of the evacuation performance of the evacuation device or to similar disadvantages. Therefore, there is the disadvantage that, in an EUV radiation producing device using tin as the EUV radiating species, the period of the maintenance and the replacement period of the evacuation device of the EUV radiation producing device must be shorter than in an EUV radiation source using xenon as the EUV radiating species.

In the field of semiconductor manufacture in which the EUV radiation producing device is practically used, the mean time to repair (MTTR) is regarded as an important parameter with respect to production costs. Since increase of the shutdown of the device due to maintenance, i.e., an increase in the mean time to repair, leads directly to an increase of production costs, there is a demand for reducing the shutdown of the device to a minimum. Therefore, it is required that the maintenance of the evacuation device in the EUV radiation producing device can be performed while the EUV radiation producing device is being operated, or an evacuation device with a long service life is expected.

SUMMARY OF THE INVENTION

A primary object of the present invention is to devise an EUV radiation producing device in which deposition of solid tin in the rotor and in the sliding part of the vacuum pump used as an evacuation device is restrained, and in the period of the maintenance and the replacement of the evacuation device of the EUV radiation producing device is prolonged.

In a device for producing EUV radiation which comprises the following:
- a vessel for producing a high density and high temperature plasma;
- a raw material supply means for supplying a raw material which contains tin and/or a tin compound in order to feed tin as a radiating species for EUV radiation into this vessel;
- a means for heating and excitation which heats and excites the raw material which is delivered to the above described vessel and which produces a high density and high temperature plasma;
- an evacuation means which is connected to the vessel; as well as
- an EUV radiation exit part which extracts EUV radiation which is emitted from the high density and high temperature plasma, the object is achieved in accordance with the invention in that, between the vessel and the evacuation means, there is a treatment unit which is used to separate tin and/or a tin compound from the evacuated gas which is released from the vessel and which contains tine and/or a tin compound.

The object is further achieved according to the invention in that the treatment unit has a collecting-storage vessel which converts the separated tin and/or separated tin compound into tin or a tin compound, collects and stores it and that the evacuated gas which does not contain tin and/or a tin compound is flown to the evacuation device.

The object is also achieved in accordance with the invention in that, in the treatment unit used in this connection, a hydrogen radical treatment part is located upstream, in which hydrogen radicals are produced, the produced hydrogen radicals react with evacuated gas which contains tin and/or a tin compound, and the tin and/or tin compound which are contained in the evacuated gas are converted into a tin hydride.

There are two types as the arrangement of the downstream side in the above described treatment unit:

One of these arrangements is characterized in that, downstream of the above described hydrogen radical treatment part, there is a heating means which heats the evacuated gas which contains tin hydride and which is released from the above described hydrogen radical treatment part to at least a temperature at which the tin is liquefied, which thermally decomposes the tin hydride and which converts the tin produced by decomposition into liquid tin and separates it out of the evacuated gas.

Another arrangement is characterized in that, downstream of the hydrogen radical treatment part, there is a cooling means which cools the evacuated gas which contains tin hydride and which is released from the hydrogen radical treatment part to at most the temperature at which the tin is liquefied, and which converts the tin into liquid tin hydride and separates it out of the evacuated gas.

Action of the Invention

In the EUV radiation producing device according to the invention, the above described arrangement prevents the evacuated gas which is released from the radiation source chamber of the vessel in which a high density and high temperature plasma is formed and which contains tin and/or a tin compound from passing through the evacuation device which is connected to the vessel. By this measure, in the treatment unit between the radiation source chamber and the evacuation device separation is carried out, by which it becomes possible for the evacuated gas which does not contain any tin and/or tin compound to pass through the evacuation device. Therefore the period of the maintenance and the replacement of the evacuation device can be prolonged.

Furthermore, there is the advantage that, in the treatment unit, tin and/or a tin compound can be converted into tin or tin compound, separated, and thus, collected and recycled as raw material.

The invention is further described below using several exemplary embodiments shown in the drawings.

DETAILED DESCRIPTION OF THE INVENTION

The basic arrangement of the EUV radiation producing device and the respective embodiment of the treatment unit are described below using FIGS. 1 to 6.

Figure 1:
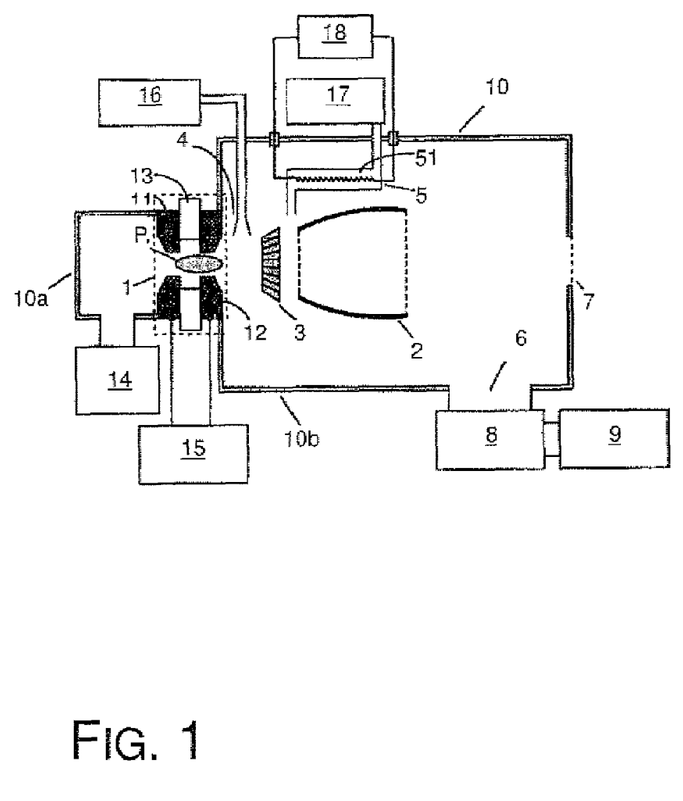
FIG. 1 is a schematic sectional view of the basic arrangement of an EUV radiation producing device of the discharge produced plasma type for which the invention is used.

FIG. 1 is a schematic sectional view of the basic arrangement of an EUV radiation producing device of the DPP type in accordance with the invention. In the radiation source chamber 10, which serves as the vacuum vessel, there are, for example, a first electrode 11 and a second electrode 12 arranged such that an insulator 13 is clamped between them. The first electrode 11, the second electrode 12, and the insulator 13 which are arranged in this way compose the discharge part 1 of the EUV producing device. The first electrode 11, the second electrode 12 and the insulator 13 are annular and arranged such that their through openings run essentially coaxially to one another. In this connection, the first electrode 11 and the second electrode 12 are connected to a pulsed power supply 15 and are electrically insulated from one another by an insulator 13.

The first electrode 11 and the second electrode 12 are made, for example, of a metal with a high melting point, such as tungsten, molybdenum, tantalum or the like. The insulator 13 is made of a ceramic with a high plasma tolerance, such as, for example, silicon nitride, aluminum nitride, boron nitride or the like.

The radiation source chamber 10 comprises a first chamber 10a and a second chamber 10b. When a plasma is ignited between the first electrode 11 and the second electrode 12 while supplying of the EUV radiating species, for example, stannane ($SnH_4$) or the like, from a raw material supply unit 14 which is connected to the first chamber 10a to the discharge part 1, the raw material which contains the EUV radiating species is heated and excited, and a plasma P is formed essentially in the middle of the discharge part 1 (middle of the through openings). This plasma P emits EUV radiation with a wavelength of 13.5 nm which is used for lithography, only when it has an extremely high density and high temperature. Therefore, for the EUV radiation producing device, a pulsed driving method is used in which momentary discharges are repeated in order to increase the peak power which is supplied to the plasma from the power supply, and thus, to produce a high density and high temperature plasma.

This means that, when power is supplied between the first electrode 11 and the second electrode 12 from the pulsed power supply 15, on the surface of the insulator 13, a creeping discharge is formed. Between the first electrode 11 and the second electrode 12, thus, essentially a short-circuit state is formed and a pulse-like large current flows between the first electrode 11 and the second electrode 12. Afterwards, a high density and high temperature plasma P, from which EUV radiation is emitted, is formed in the essential center of the discharge part 1 (center of the through openings) by Joule heating by the pinch effect.

The EUV radiation from the discharge part 1 is emitted from the EUV radiation exit part 7 via a collector mirror 2 which is located in the second chamber 10b. The radiation emerging from the EUV radiation exit part 7 travels to the optical system on the side of an exposure tool (not shown).

The collector mirror 2 is made in the form of an ellipsoid of rotation or in the form a paraboloid of rotation and is made of a metallic material, such as nickel or the like. Its reflection surface is coated with a metal, such as ruthenium, molybdenum, rhodium or the like, in order to reflect the EUV radiation with high efficiency. The reflection surface is, moreover, formed with a grazing-incidence angle of at most 25°, by which the EUV radiation can be effectively reflected.

Between the discharge part 1 and the collector mirror 2, there is a debris trap 3 which is used to capture contaminants, such as metallic powder and metallic particles or the like, which are formed by contact of the first electrode 11 and the second electrode 12 with the plasma P. The debris trap 3 is formed for example, of a metal with a high melting point, such as tungsten, molybdenum or the like.

In the vicinity of the debris trap 3, there is a gas curtain nozzle 4 which is connected to a gas supply unit 16 which supplies an inert gas as helium, argon or the like. The inert gas which is supplied from the gas supply unit 16 is supplied to the entrance side of the debris trap 3 by the gas curtain nozzle 4.

The gas curtain which has been formed in this way prevents the debris from reaching the collector mirror 2 by bending the trajectory of the debris which are released from the discharge part 1 in the direction toward the collector mirror 2, or by reducing the velocity of the debris due to the collisions between the particles at a intentionally high gas pressure local region.

However, in reality, it is difficult to completely catch and eliminate the debris without shielding of any EUV radiation and the debris still reach the collector mirror 2.

To eliminate the tin which deposits on the collector mirror 2 as debris, for example, as shown in FIG. 1, a thermal catalyst type hydrogen radical producing part 5 is used in which a tungsten filament 51, which has been heated to roughly 1800° C. by a heating power supply 18, is provided with hydrogen gas from a gas supply unit 17 and in which hydrogen radicals are generated by contact and dissociation. This means that the collector mirror 2 on which the tin deposits is irradiated with the hydrogen radicals which are produced in the hydrogen radical producing part 5, these hydrogen radicals can react with tin and the tine converts into tin hydride with a high vapor pressure. In this way, the tin is vaporized and eliminated, by which a reduction of the reflectance of the EUV radiation of the collector mirror 2 is prevented.

When the above described EUV radiation producing device is being operated, the portion of the raw material for supply of tin as the EUV radiating species which does not contribute to producing the high density and high temperature plasma P and the portion of the said raw material which has become unnecessary after the contribution to production of the high density and high temperature plasma P are diffused in the second chamber 10b and at least partially evacuated from an outlet opening 6 as evacuated gas. Furthermore, the tin hydride which deposits on the collector mirror 2 and the like as solid tin and which afterwards reacts with the hydrogen radicals and has been vaporized, evacuated from the outlet opening 6 as evacuated gas.

The evacuated gas which has been flown from the outlet opening 6 of the radiation source chamber 10 as a vacuum vessel to the treatment unit 8 is subjected to treatment in the treatment unit 8, in which tin and/or a tin compound are separated. Only the evacuated gas which contains neither tin nor a tin compound flows into an evacuation device 9. Different embodiments of this treatment unit 8 are described below.

Figure 2A:
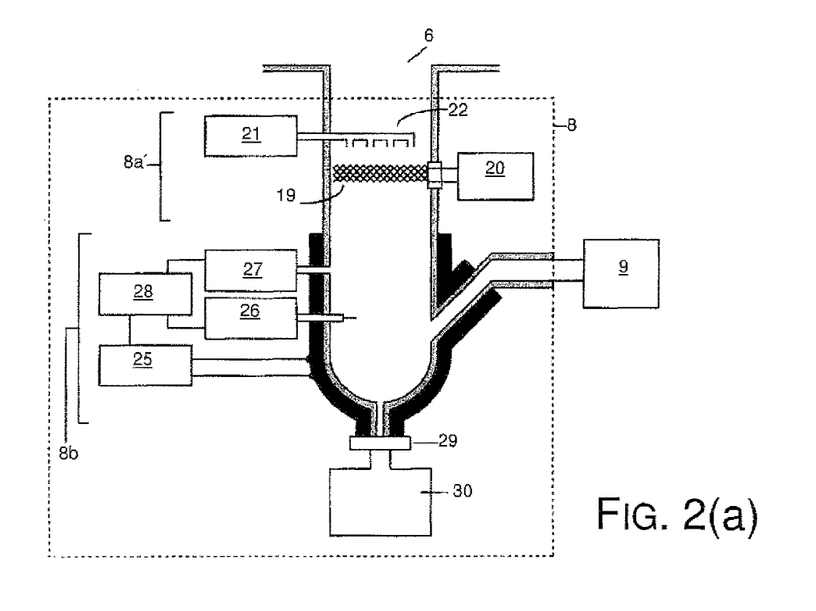
FIG. 2(a) is a cross-sectional view of a first embodiment of the arrangement of the treatment unit in accordance with the invention.
Figure 2B:
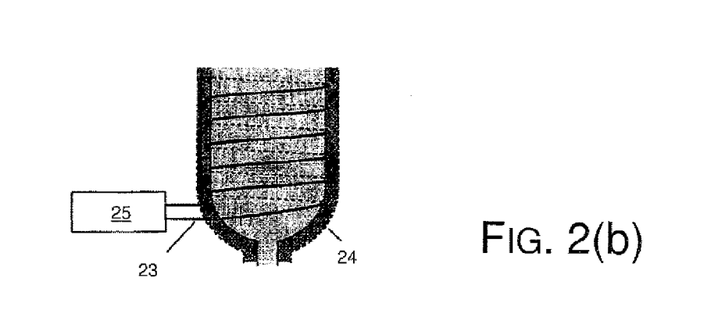
FIG. 2(b) shows an outside view of a heat treatment part.

FIG. 2(a) is a cross section of a first embodiment of the arrangement of the treatment unit 8. FIG. 2(b) is an outside view of the heating treatment part 8b of the treatment unit 8. Apparent from these figures, the treatment unit 8 comprises, for example, a steel tube and has an arrangement of two-stage treatment process to separate the tin and/or tin compound from the evacuated gas which contains tin and/or a tin compound.

First, on the side of the vacuum vessel (side of the second chamber 10b) of the treatment unit 8, there is a hydrogen radical treatment part 8a to convert tin and/or a tin compound in the evacuated gas into a hydride and to make it chemically stable stannane. In the hydrogen radical treatment part 8a, for example, there is a mesh texture tungsten filament 19 that extends across the flow path of the evacuated gas. A heating power supply 20 is connected to the tungsten filament 19. Furthermore, a hydrogen gas supply nozzle 22, which is connected to a hydrogen gas supply unit 12, is arranged such that the hydrogen gas which is released from the hydrogen gas supply nozzle 22 reaches the tungsten filament 19.

When power is supplied to the tungsten filament 19 by means of a heating power supply 20 and the tungsten filament 19 is heated to roughly 1800° C. and if hydrogen gas is supplied to the tungsten filament 19 from the hydrogen gas supply nozzle 22 connected to the hydrogen gas supply unit 21, contact and dissociation of hydrogen gas with the tungsten filament 19 yield hydrogen radicals. This means that, in the hydrogen radical treatment part 8a, a hydrogen radical source of the thermal catalyst type is formed. By the reaction of the generated hydrogen radicals with the evacuated gas which contains tin and/or a tin compound, the tin and/or tin compound which are contained in the evacuated gas passing through the hydrogen radical treatment part 8a can be converted into tin hydride (for example, stannane).

Here, the tin which is converted into tin hydride is defined as tin which exists independently of the phase and its state as a elemental substance (not as a compound) such as, for example, tin (Sn) vapor, tin grains (metallic clusters) such as, for example, $Sn_x$ or the like).

The tin compound which is converted into tin hydride is, for example, tin carbide, tin oxide and the like which are formed by a gaseous phase reaction of the tin (Sn vapor as atomic gas, metallic clusters of $Sn_x$ and the like) or of fragments such as $SnH$, $SnH_2$, $SnH_3$ (hereinafter $SnH_x$) with water ($H_2O$), carbon hydride and the like which remain in the device.

The fragments of $SnH_x$ are tin hydride. When the tin hydride which is produced in the hydrogen radical treatment part 8a is stannane, the fragments of $SnH_x$ which are not stannane react with the hydrogen radicals and are converted into stannane. In this case, the fragments of $SnH_x$ which are not stannane are also treated as tin compounds which are converted into tin hydride (stannane).

The tin hydride which is produced in the hydrogen radical treatment part 8a need not always be stannane, but can also be other tin hydride with a high vapor pressure, such as $Sn_2H_6$ or the like. This means that it is just required that the hydrogen radical treatment part 8a has the function of converting tin and/or a tin compound which are contained in the evacuated gas into tin hydride with a high vapor pressure and conveying it to the heating treatment part 8b described below and the cooling treatment part 8c described below.

However, since stannane is chemically most stable in tin hydride with a high vapor pressure, it can be imagined that the tin hydride which is produced in the hydrogen radical treatment part 8a is stannane.

Next, on the side of the evacuation device 9 of the treatment unit 8, there is a heating treatment part 8b to separate stannane from the evacuated gas. The heating treatment part 8b, as is shown, for example, in FIG. 2(b), has an arrangement in a heating apparatus 23 is wound appressed around the outside of steel tube which becomes the evacuated gas passage, and in which the heating site and the heating apparatus 23 are covered with a heating insulating material 24 in order to prevent heat from dissipating. The heating apparatus 23 is connected to a heating power supply 25. If power is supplied to the heating apparatus 23 from the heating power supply 25, the steel tube which the evacuated gas passes through is heated at the area where the heating apparatus 23 is wound appressed.

The temperature and the pressure of the heated evacuated gas within the steel tube are detected by a temperature sensor 26 and a pressure sensor 27. The power supplied to the heating apparatus 23 by the heating power supply 25 is controlled by a control unit 28. Said control is carried out such that the heating treatment part 8b reaches a temperature at which the tin becomes liquid by comparing the data of the temperature and pressure of the evacuated gas which have been detected in the above described manner and the vapor pressure data of the tin which are stored beforehand in the control unit 28 to one another. Then the stannane which is contained in the evacuated gas and which passes through the steel tube of the evacuated gas passage is thermally decomposed. The tin which is produced by the decomposition of the stannane between liquid tin which adheres to the inside wall surface of the steel tube of the passage. In this way, the stannane is separated from the evacuated gas.

The evacuated gas is fed into the evacuation device 9 after separation. On the other hand, the liquid tin which is adhering to the wall surface runs down the wall surface of the steel tube and is collected in the lower region of the heating treatment part 8b. The bottom of the heating treatment part 8b is coupled via a valve 29 to a collecting-storage vessel 30. The liquid tin which gathers at the bottom of the heating treatment part 8b can be transferred to the collecting-storage vessel 30 by opening and shutting the valve 29.

Figure 3A:
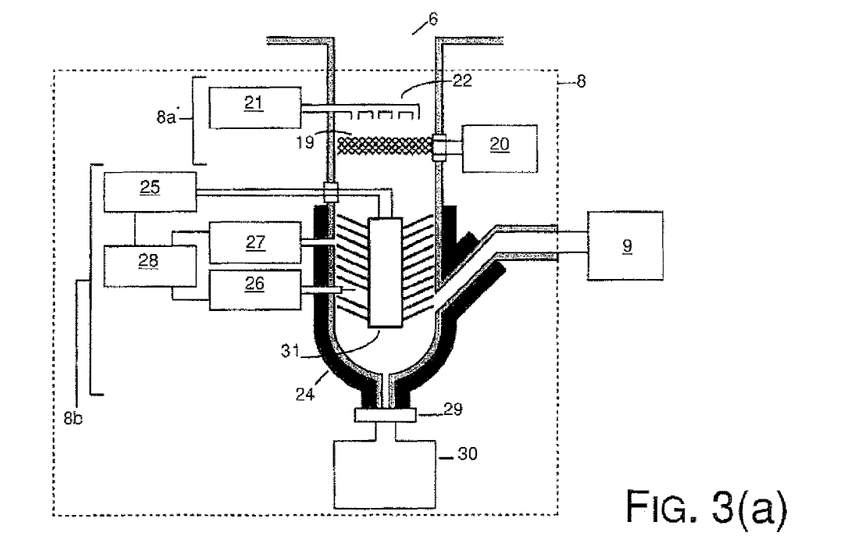
FIG. 3(a) is a cross-sectional view of a second embodiment of the arrangement of the treatment unit of the invention.
Figure 3B:
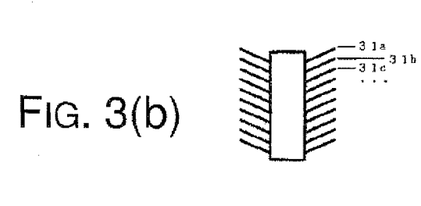
FIG. 3(b) shows a cross section of a heating structure of the treatment unit of FIG. 3(a)
Figure 3C:
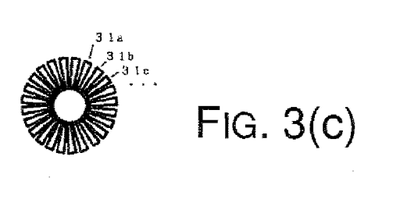
FIG. 3(c) shows a top view of the heating structure shown in FIG. 3(b)

FIG. 3(a) is a cross section of a second embodiment of the arrangement of the treatment unit 8 of the invention. FIG. 3(b) is a schematic view in which the heating structure 31, of FIG. 3(a) is shown by itself. FIG. 3(c) is a schematic view in which the heating structure 31 which is shown in FIG. 3(b) is viewed from above.

As these figures show, for the heating treatment part 8b for example in the steel tube as the evacuated gas passage, a heating structure 31 which built in a heating apparatus to the frame of stainless steel, ceramic or the like is arranged. The heating structure 31 is connected to the heating power supply 25. When power is supplied to the heating structure 31 from the heating power supply 25, the heating structure 31 is heated. The steel tube in the vicinity of the heating structure 31 is covered with a heating insulating material 24 so that heat does not dissipate.

The heating structure 31 is formed on numerous fins 31, 31a, 31b, 31c . . . which are designed to enlarge the contact area of the evacuated gas which is flowing through, to achieve heat exchange with high efficiency, and to accrete and collect the the tin which is liquefied as a result of heat exchange. The fins 31a, 31b, 31c . . . , as is shown in FIG. 3(c), are arranged such that their openings become smaller in a radially inward direction when the heating structure 31 is viewed from the upstream side. The fins 31a, 31b, 31c . . . are furthermore inclined, as is shown in FIG. 3(b). They are formed such that the liquid tin adhering to the fins 31a, 31b, 31c . . . can easily flow down.

The temperature control process by the temperature sensor 26 and the pressure sensor 27 and the tin collection process after separation are not further described since they are identical to the case of the first embodiment (FIG. 2).

In the first embodiment (FIG. 2), heating is carried out from outside the steel tube by the heating apparatus 23. In this configuration, when the flow rate of the evacuated gas which is flowing in the treatment unit 8 increases, the heat does not adequately reach the middle area of the evacuated gas passage, since the diameter (i.e., the diameter of the steel tube) of the evacuated gas passage must be increased in accordance with the increasing flow rate of the evacuated gas. Therefore, it becomes difficult to thermally decompose the stannane and to liquefy sufficiently the tin which is produced by the decomposition. As a result, it can be imagined that instead of increasing the diameter of the steel tube the following is done:

The steel tube is divided into several parts;

The stannane is separated on the respective steel tube which has been formed by the division; Collection is performed on the respective outlet of the divided steel tube and from which the separated evacuated gas is being released;

An arrangement is employed in which the steel tubes which are connected to the evacuation device 9 are arranged parallel to one another; and Thus, a corresponding measure against the increase in the flow rate of the evacuated gas is taken.

However, the parallel arrangement of the steel tubes, in reality, does not correspond to a large flow rate, since the shape of the part (the manifold) from which the steel tubes branch and the steel tubes are combined, becomes complicated, and therefore, the number of parallel tubes is limited by itself. By the arrangement according to this embodiment (FIG. 3), even if the diameter of the evacuated gas passage is increased, there is conversely the advantage of simplification of measures for corresponding to the large flow rate by the arrangement of the heating structure 31 with a corresponding size in the steel tube.

Figure 4A:
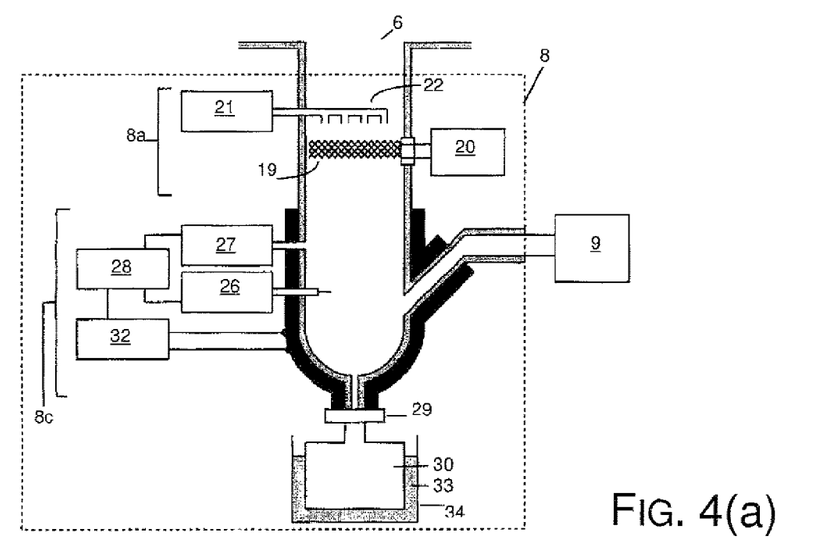
FIG. 4(a) is a cross-sectional view of a third embodiment of the arrangement of the treatment unit.
Figure 4B:
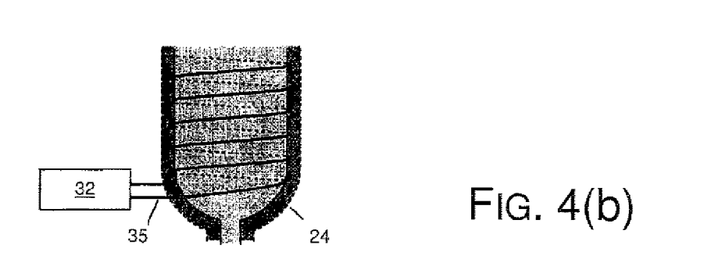
FIG. 4(b) shows an outside view of the cooling treatment part of the FIG. 4(a) arrangement.

FIG. 4(*a*) is a cross section of a third embodiment of the arrangement of the treatment unit 8 in accordance with the invention. FIG. 4(*b*) is an outside view of the cooling treatment part 8*c* of the treatment unit 8. In these figures, the treatment unit 8, for example, is formed of a steel tube as in the first and second embodiments shown in FIGS. 2 & 3 and has an arrangement in which a two-stage treatment process is carried out to separate the tine and/or the tin compound from the evacuated gas which contains the tin and/or tin compound.

First, on the side of the vacuum vessel (side of the second chamber 10*b*) of the treatment unit 8, there is a hydrogen radical treatment part 8*a* with an arrangement and operation which are identical to FIG. 2 and therefore are not further described. This means that the evacuated gas which contains tin and/or a tin compound passes through the hydrogen radical treatment part 8*a*, afterwards becomes a evacuated gas which contains stannane and is fed into the cooling treatment unit 8*c* described below.

Next on the side of the evacuation device 9 of the treatment unit 8 there is a cooling treatment part 8*c* for separating the stannane which is contained in the evacuated gas. The cooling treatment part 8*c*, as is shown, for example, in FIG. 4(*b*), is arranged such that, a copper pipe 35 is wound appressed around the outside of the steel tube in the area of the evacuated gas passage. The copper pipe 35 is connected to a cooling device 32. If a coolant is allowed to circulate-by the cooling device 32 in the copper pipe 35, the area of the steel tube is cooled at the evacuated gas passage area where the copper pipe 35 is wound appressed. Furthermore, the steel tube is covered with a heat insulating material 24 in the vicinity of the points to be cooled to prevent the cooling effect from being dissipated.

The temperature and the pressure of the evacuated gas within the steel tube which is to be cooled are detected by a temperature sensor 26 and a pressure sensor 27, respectively. The temperature of the cooling treatment part 8*c* is adjusted to the temperature at which the stannane is liquefied using a control unit 28 in which the data of the temperature and pressure of the evacuated gas which are detected in the above described manner and the vapor pressure data of the stannane which are stored beforehand in the control unit 28 are compared to one another, so that the stannane which is contained in the evacuated gas and which passes through the steel tube is condensed and is converted into liquid tin. Furthermore, this liquid stannane can be allowed to adhere to the inside wall of the steel tube of the passage. In this way, the stannane is separated from the evacuated gas and the evacuated gas is fed into the evacuation device 9 after separation. The liquid stannane which remains on the wall surface of the steel tube runs down along the wall surface and is gathered in the lower region of the cooling treatment part 8*c*.

The lower region of the cooling treatment part 8*c* is coupled via a valve 29 to a collecting-storage vessel 30. The liquid stannane which has been collected in the lower region of the cooling treatment part 8*c* can, therefore, be transferred to the collecting-storage vessel 30 by opening and shutting the valve 29. The collecting-storage vessel 30 is located within a cooling basin 34 in which there is a cooling medium 33. The collecting-storage vessel 30 is cooled by the cooling medium 33 such that the liquid stannane stored therein is preserved unchanged in the liquid phase state.

Figure 5A:
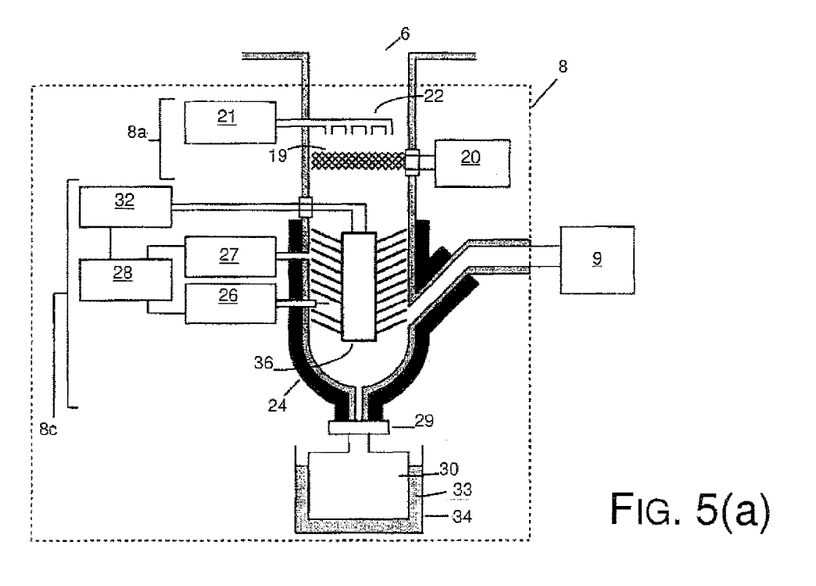
FIG. 5(a) shows a cross section of a fourth embodiment of the arrangement of the treatment unit of the invention.
Figure 5B:
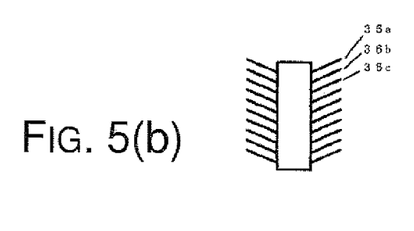
FIG. 5(b) shows a cross section of an endothermic structure of the FIG. 5(a) arrangement.
Figure 5C:
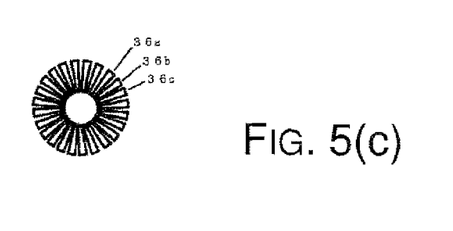
FIG. 5(c) is a top view of the endothermic structure of FIG. 5(b)

FIG 5(*a*) is a cross section of a fourth embodiment of the arrangement of the treatment unit 8 of the invention. FIG. 5(*b*) is a schematic view in which the endothermic structure shown in FIG. 5(*a*) is shown by itself. FIG. 5(*c*) is a schematic view in which the endothermic structure 31 shown in FIG. 5(*b*) is viewed from above. As these figures shown, in the cooling treatment part 8*c*, for example, in the steel tube evacuated gas pressure, there is an endothermic structure 36 in which there is a coolant circulation line path in a frame of copper, aluminum or the like.

A cooling device 32 is connected to the coolant circulation line path of the endothermic structure 36. By supplying a cooling medium from the cooling device 32, the endothermic structure 36 is cooled. The steel tube in the vicinity of the endothermic structure 36 is covered with a heat insulating material 24 to prevent the cooling air from being dissipated.

The endothermic structure 36 has fins 36*a*, 36*b*, 36*c* . . . which are designed to enlarge the contact area of the evacuated gas which is flowing through, to achieve heat exchange with high efficiency, and to accrete and collect the stannane which is liquefied as a result of heat exchange. The fins 31*a*, 31*b*, 31*c* . . . , as is shown in FIG. 5(*c*), are arranged such that their openings become smaller in a radially inward direction when the endothermic structure 36 is viewed from the upstream side. Furthermore, the fins 36*a*, 36*b*, 36*c* . . . are inclined downward, as is shown in FIG. 5(*b*). They are formed such that the liquid stannane adhering to them can easily flow down.

The temperature control process by the temperature sensor 26 and the pressure sensor 27 and the stannane collection process after separation are not further described since they are identical to the case of the third embodiment (FIG. 4).

The advantage of the arrangement of this embodiment (FIG. 5) is the corresponding measure against increasing the flow rate of the evacuated gas is simpler than the arrangement according to the third embodiment (FIG. 4). The reason for this is identical to the case according to the second embodiment (FIG. 3) and is not further described.

As was described above, in the treatment unit 8 according to the first embodiment (FIG. 2), according to the second embodiment (FIG. 3), according to the third embodiment (FIG. 4), and according to the fourth embodiment (FIG. 5), hydrogen radicals are produced using a thermal catalyst by the front half of the treatment unit 8 being formed as a hydrogen radical treatment part 8*a*. However, since, in accordance with the invention, it is sufficient if the hydrogen radicals act on the evacuate gas which contains tin and/or a tin compound in the evacuated gas passage, the process for producing the hydrogen radicals is not especially limited, and hydrogen radicals can also be produced, for example, using an electron beam and a plasma.

Figure 6:
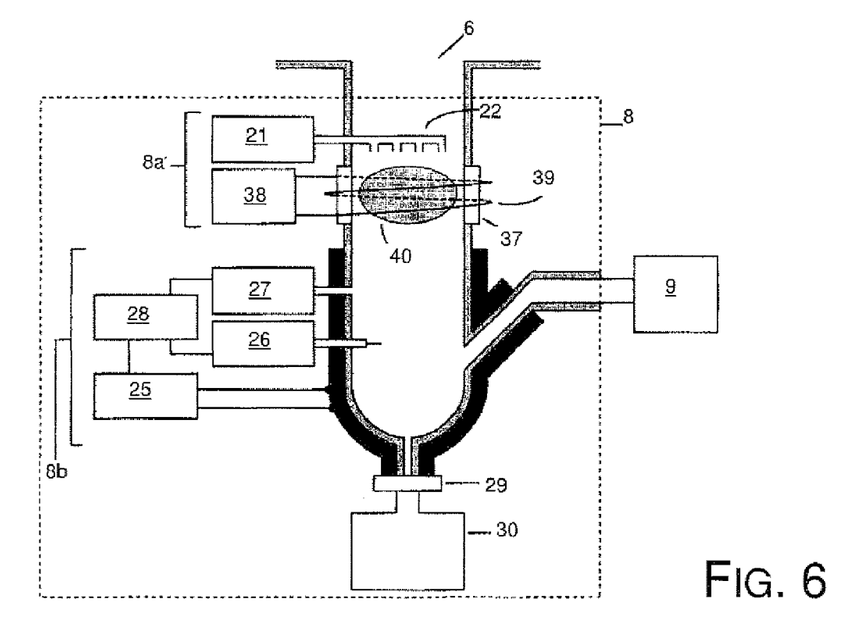
FIG. 6 shows a schematic view of an arrangement in which a plasma is used to produce the hydrogen radicals in the treatment unit according to the embodiments of the invention.

FIG. 6 is a cross section of the arrangement in which a plasma is used to produce hydrogen radicals in the hydrogen radical treatment part 8a of the treatment unit 8.

The treatment unit 8 as in the first to fourth embodiments comprises, for example, a steel tube and has an arrangement in which a two-stage treatment process is carried out to separate the tin and/or tin compound from the evacuated gas which contains tin and/or a tin compound.

First, the hydrogen radical treatment part 8a which is located on the side of the vacuum vessel (side of the second chamber 10b) of the treatment unit 8 has an arrangement in which, for example, part of the evacuated gas passage is formed as a silica glass tube in which, on the outside of the silica glass tube 37, there is an induction coil 39 connected to a radio frequency power supply 38 and in which hydrogen gas can be supplied from the hydrogen gas supply nozzle 22 which is located in the hydrogen gas supply unit 21 to the silica glass tube 37. When hydrogen gas is supplied from the hydrogen gas supply nozzle 22 to the silica glass tube 37 and a radio frequency power is applied from the radio frequency power supply 38 to the induction coil 39, a plasma 40 is formed in the silica glass tube 37 by an electromagnetic field which has been formed by the induction coil 30. Since there is a large quantity of hydrogen ions and hydrogen radicals in the plasma 40, the evacuated gas passing through can be converted into hydride.

The arrangement and the reaction of the heating treatment part 8b which is located on the side of the evacuation device 9 of the treatment unit 8 are identical to the first and second embodiment and therefore are not further described. Of course, instead of the heating treatment part 8b the cooling treatment part 8c according to the third and fourth embodiments can also be used.

As was described above, the extreme UV radiation producing device (EUV radiation producing device) of the invention can separate tin and/or a tin compound from the evacuated gas which contains tin and/or a tin compound in the treatment unit. Therefore the period of maintenance and the replacement of the evacuation device can be prolonged and the mean time between repairs of the semiconductor exposure system using the EUV radiation producing device can be shortened.

In the above described embodiments, a case of use for an EUV radiation producing device of the DPP type is shown. However, the invention can, of course, also be used for an EUV producing device of the LPP type.

What is claimed is:

1. Device for producing extreme UV radiation, comprising:
    a vessel for producing a high density and high temperature plasma;
    a raw material supply means for supplying a raw material which contains at least one of tin and a tin compound in order to feed as a species for extreme UV radiation into the vessel;
    a means for heating and excitation which heats and excites the raw material which has been delivered to the vessel and which produces a high density and high temperature plasma;
    an evacuation device which is connected to the vessel;
    an extreme UV radiation exit part which extracts extreme UV radiation which is emitted from the high density and high temperature plasma; and
    a treatment unit between the vessel and the evacuation device, the treatment unit having means for separating at least one of tin and a tin compound from a evacuated gas which is released from the vessel and which contains at least one of tin and a tin compound.

2. Device for producing extreme UV radiation as claimed in claim 1, wherein the treatment unit has a collecting-storage vessel for capturing the separated at least one of tin and a tin compound.

3. Device for producing extreme UV radiation as claimed in claim 1, further comprising means for supplying the evacuated gas from which the at least one of tin and a tin compound has essentially been removed to the evacuation device.

4. Device for producing extreme UV radiation as claimed in claim 1, wherein the treatment unit contains a hydrogen radical treatment part for producing hydrogen radicals that react with the evacuated gas which contains at least one of tin and at in compound for converting the at least one of tin and a tin compound which is contained in the evacuated gas into tin hydride.

5. Device for producing extreme UV radiation as claimed in claim 4, wherein, downstream of the hydrogen radical treatment part, there is a heating means for heating the evacuated gas which contains tin hydride and which is released from the hydrogen radical treatment part to at least the temperature at which tin is liquefied, thermally decomposing tin hydride to the tin, converting the tin produced by decomposition into liquid tin and separating it from the evacuated gas.

6. Device for producing extreme UV radiation as claimed in claim 4, wherein downstream of the hydrogen radical treatment part,
    there is a cooling means for cooling the discharge gas which contains tin hydride and which is released from the hydrogen radical treatment part to at most the temperature at which the tin hydride is liquefied, converting the tin hydride to the liquid tin hydride and separating the liquid tin hydride from the evacuated gas.

* * * * *